Nov. 19, 1929.  F. M. HARM  1,736,593
CIRCULATING DEVICE
Filed April 2, 1928
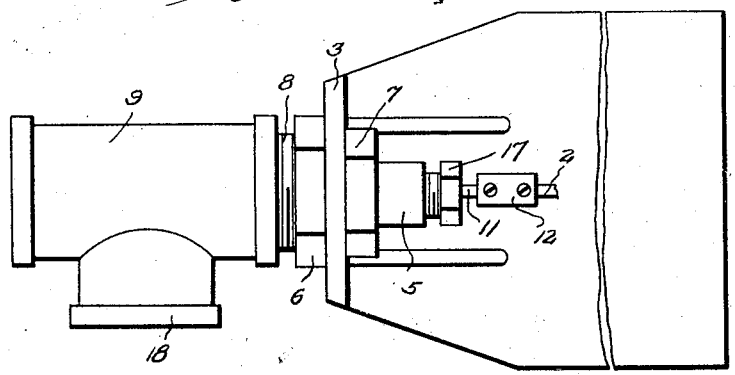
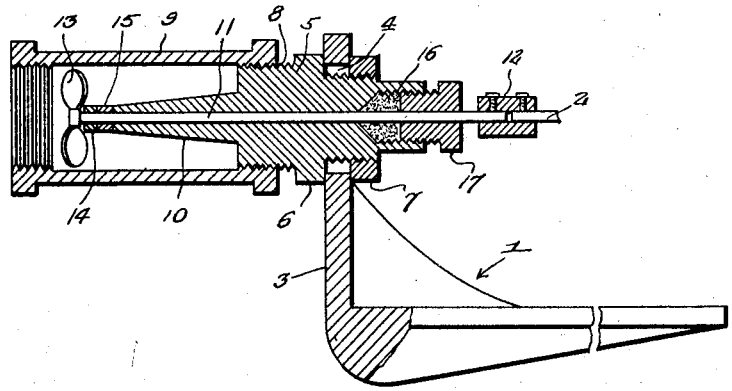
Inventor
F. M. Harm,
By Clarence A. O'Brien
Attorney Patented Nov. 19, 1929

1,736,593

UNITED STATES PATENT OFFICE

FRANKLIN M. HARM, OF ROCHESTER, NEW YORK

CIRCULATING DEVICE

Application filed April 2, 1928. Serial No. 266,752. REISSUED

The present invention relates to a circulating device for use in conjunction with a hot water system to effect the "return" water back from the radiators and thus accelerate the flow of the hot water, whereby the heating system is rendered more efficient.

Another important object of the invention is to provide a circulating device of the above mentioned character, which is simple in construction, inexpensive, strong and durable, and further well adapted to the purpose for which it is designed.

Other objects of the invention will become apparent as the nature of the invention proceeds and when taken in connection with the accompanying drawing.

In the accompanying drawing, forming a part of this application and in which like numerals designate like parts throughout the several views:

Figure 1 is a top plan view of the circulating device embodying my invention, and Figure 2 is a vertical sectional view therethrough.

In the drawing, wherein for the purpose of illustration is shown the preferred embodiment of my invention, the numeral 1 designates a substantially right angular supporting bracket on the base or horizontal portion of which is preferably adapted to be supported a portable electric motor of any conventional construction (not shown).

The drive shaft of the motor is partially disclosed and is designated by the numeral 2. The vertical wall 3 of the right angular shaped supporting bracket 1 is formed in its upper portion with an enlarged opening 4, through which extends the intermediate portion of a plug 5, and as is more clearly disclosed in Figure 2, said plug is formed with a flange 6 that engages with the one side face of the vertical wall 3 of the bracket 1, a lock nut 7 being threaded on the intermediate portion of the plug for engagement with the opposite side of the vertical wall of the bracket to rigidly secure the plug in a horizontal position.

The inner portion of the plug 5 is externally threaded, as shown at 8, for supporting one end of a T-shaped coupling or fitting 9.

An elongated tapered extension 10 is formed on the inner end of the plug 4 for disposition within the fitting 9 and extending centrally through the plug and said extension is the driven shaft 11, the outer end of which is operatively connected to the drive shaft 2, by the coupling 12.

A liquid circulating propeller 13 is secured on the inner end of the driven shaft 11 for disposition within the fitting 9 adjacent the outer end thereof and suitable thrust collars 14 and 15 are arranged on the inner end of the driven shaft between the propeller 13 and the smaller end of the tapered extension 10.

The thrust collar 14 is preferably formed of steel, while the thrust collar 15 is of bronze. The propeller 13 is preferably of bronze as is also the driven shaft 11.

The outer end of the plug 5 is reduced and provides a socket for receiving suitable packing 16, and a packing nut 17, is threaded in the socket for feeding the lubricant to the driven shaft in the manner well known in the art.

The inlet end of the fitting 9 is shown at 18. While I have shown the shaft 11 as being driven by the drive shaft of a motor supported on the bracket 1, it is to be understood that any other suitable means may be provided for actuating the driven shaft, and furthermore, if an electric motor is employed, the current to the motor may be automatically controlled by the thermostatic systems operating from the boilers or various parts of the heating systems or by the draft mechanisms controlling the temperature of the boilers, or else by timing arrangement.

When the circulating device is used in conjunction with a hot water heating system, the device will effect the circulation of water through the radiators in such a manner as to bring about a reduction of temperature in the boilers from 180° to 150°, in a very little time, thus indicating that the hot water is being delivered to the radiators where it is, of course, most effective for heating purposes.

The circulating device may also be used to circulate the liquid in a refrigerating system. The simplicity of my device enables the parts to be readily and easily assembled or disassembled and can furthermore be manufactured at a very low cost and be strong and durable.

While I have shown the preferred embodiment of my invention, it is to be understood that minor changes in the size, shape, and arrangement of parts may be resorted to, without departing from the spirit of the invention and the scope of the appended claim.

Having thus described my invention, what I claim as new is:

A fluid circulating device comprising in combination, a T-shaped fitting through which a fluid is adapted to flow, an angular motor supporting bracket, the vertical wall of said angular bracket being formed with an enlarged opening, a plug extending through the opening, means for rigidly securing the plug on the bracket, the inner end of the plug being threaded in one end of the T-shaped fitting, a reduced extension formed on the inner end of the plug for disposition within the fitting, a driven shaft extending through the plug and said extension, a drive shaft for connection with the outer end of the driven shaft, a propeller secured on the inner end of the driven shaft for rotation in the fitting adjacent the end of the fitting opposite that in which the plug is disposed, said last mentioned end forming the outlet, the leg portion of the T-shaped fitting providing the inlet.

In testimony whereof I affix my signature.

FRANKLIN M. HARM.